June 6, 1939.  L. R. LUECK  2,160,974
DISTRESS SIGNAL
Filed Feb. 8, 1937
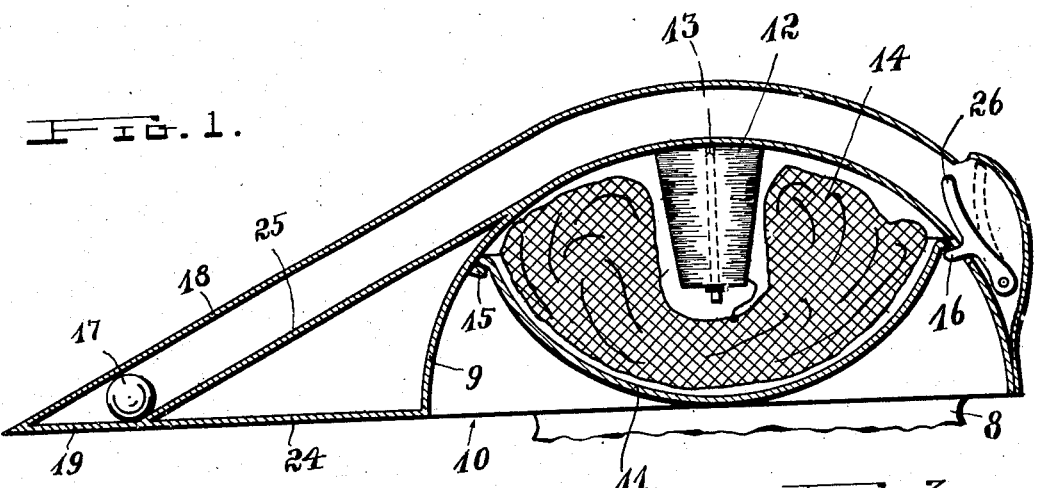
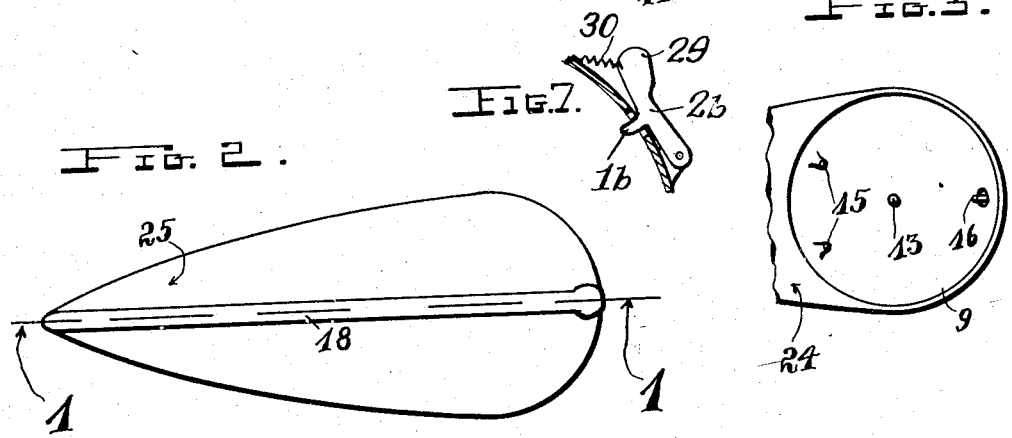
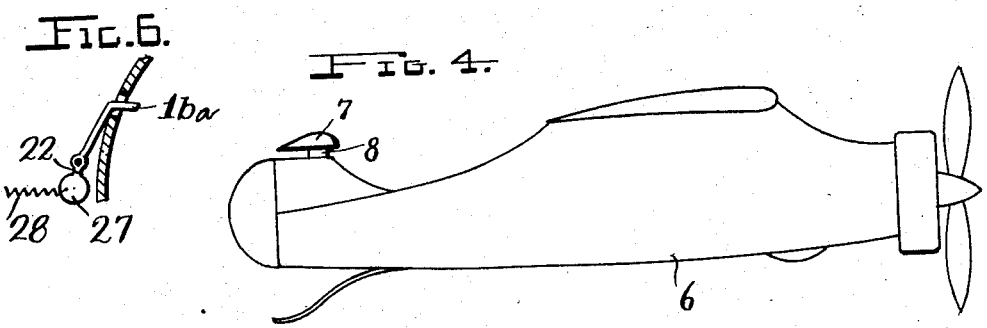
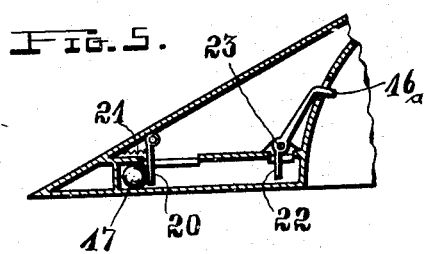
INVENTOR:
LAWRENCE R. LUECK,
By: Otho H. Kruger,
his Atty.

Patented June 6, 1939

2,160,974

UNITED STATES PATENT OFFICE 2,160,974

DISTRESS SIGNAL

Lawrence R. Lueck, El Monte, Calif.

Application February 8, 1937, Serial No. 124,662

10 Claims. (Cl. 116—124)

This invention relates to devices that may be used to show the location of people in need of help.

One of the objects of this invention is to provide a device that may be a standard part of aircraft, designed to release means that may rise to a suitable height, to be seen from a distance.

Another object is to provide actuating means designed to operate only upon any undue shock, as by a crash or wreck of an aircraft.

Another object is to provide a locking device for holding an actuating member in inoperative position regardless of normal actions and changes of level of aircraft.

Another object is to provide means by which a location indicator may be held ready to be discharged by the action of such actuating member.

Another object is to provide an indicator precharged ready to rise upon being released from the holding means.

Another object is to provide means whereby the indicator is held connected to a wreck regardless of different drifting forces.

Other objects will appear from the following description and appended claims as well as from the accompanying drawing, in which—

Fig. 1 is a longitudinal mid-sectional view of a simple device with operating means for holding and discharging a distress indicator, according to this invention.

Fig. 2 is a top plan view of the device illustrated in Fig. 1.

Fig. 3 is a fragmentary bottom view of the device illustrated in Fig. 1, as seen in the direction of the arrow 3.

Fig. 4 is a side elevation of a certain type of aircraft, in fine lines, with an outline of the device of the present invention in heavier lines, in one position.

Fig. 5 is a fragmentary longitudinal mid-sectional view of a slightly modified form of the portion of the device for holding the actuating member.

Fig. 6 is a fragmentary detail view of a slightly modified form for the weighted lever control.

Fig. 7 is a fragmentary detail view of another slightly modified form of lever control.

If an aircraft is forced down unexpectedly, it is, as a rule, in isolated places, unfortunate, not only for the occupants of the aircraft, but, also for any one interested in establishing the location of the aircraft, since any aircraft, particularly, in mountainous regions, in canyons, or among trees, can eventually not be seen from any material distance, and in case of serious accidents, when the occupants are not able to give any signals, searching parties have difficulties giving prompt and ready help, principally by not knowing in which direction to go.

An automatically functioning indicator for the location of any aircraft under such condition can be of great value.

The principal feature of this invention is therefore to provide an indicator permanently attached to any sort of aircraft, or any craft moving over or about little populated districts, which will automatically be released upon any accident that occurred with any undue shock so as to rise to a suitable height, to be seen by others though the craft may be hidden by anything that obstructs the view.

As part of the indicator, a small balloon is believed most suitable to carry a sufficiently long connecting means whereby the balloon may rise to a height at which it may be seen from a greater distance than the craft on the ground could possibly be recognized or even found, the connecting member remaining permanently attached to the craft so as to retain the balloon at a point above the craft.

Such a balloon may readily be maintained filled with a required lifting medium, to carry the balloon upwardly as soon as released.

In Fig. 4, on the aircraft 6, a small device 7 is indicated in a certain position on the aircraft, but it should be understood that such a device may be arranged at any other suitable point of any craft, preferably in such a position, however, that any released balloon can freely rise to its intended height above the craft.

Fig. 1 shows such a device in an enlarged, vertical, longitudinal, mid-sectional view, 8 indicating any sort of connecting bracket whereby the device is permanently attached to the craft.

As illustrated in Fig. 1, the device embodies a cap 9, open at the bottom, as indicated at 10; a bowl 11, detachably disposed in the hollow of the cap; a flexible connecting member 12, such as a fine flexible wire, or a cord, normally wound in form of a spool, of which a central stem 13 is permanently secured to the cap, and the connecting member being also permanently connected or secured to, either, the stem 13, or the cap 9 at one end of the connecting member; and a balloon 14, permanently secured to the other end of the connecting member; as the principal parts.

The balloon is preferably filled with the required lifting medium preparatory to being inserted between the cap 9 and the bowl 11, such a lifting medium to be under such a pressure as to serve as a discharging means from the inserted position so that upon any release the balloon will expand and thereby force itself out of its cramped enclosed position.

Having shown the connecting line 12 mounted with its axis in an upright position is merely with the idea that the line may more readily unwind itself as the balloon moves away from the device, though, otherwise, the invention is not limited to such minor details or forms of details.

For retaining the balloon in such cramped or compressed position, the bowl 11 is engaged about its edges by pins 15 in the cap 9 along one side, and by a releasable catch-pin 16 along the opposite side.

The principle of this arrangement is that, upon a disengagement of the catch-pin, the bowl will be forced out of the hollow of the cap by the compressed balloon, first, the bowl being tilted along the disengaged side, and then dropping from engagement with respect to the pins 15, thereby freeing the balloon entirely, to escape from its cramped and compressed position within the cap.

The escaped balloon then readily rises to a point above the device to the extent that the length of the connecting member 12 allows, the connecting member remaining attached to the device with one end and with its other end holding the balloon attached to the device.

A simple means of disengaging the catch-pin from the one side of the bowl is a rolling ball of suitable weight, disposed in such a manner that it normally will remain inactive, this ball 17 being shown disposed in a tubular structure 18, closed at one end 19, and with its open end extending towards the catch-pin 16.

Accidental landing will commonly involve an abnormal shock to an aircraft upon contacting anything, and such an abnormal shock is expected to dislodge the ball 17 from its normal inactive position to such an extent that it will roll towards the opposite end of its rolling path until it hits the catch-pin 16 so as to disengage this from the bowl, to thereby free the balloon.

Exception may be taken to this state of equilibrium of any actuating member with respect to the supporting craft when it concerns aircraft handled otherwise than in a level plane, for which reason a freeing of the indicator is not meant to be limited to the actions of a ball disposed as stated above, and this simple arrangement may be considered useful best for that type of craft that is operated largely in a level plane.

In all cases where tilting of the craft may be involved, other more practical arrangements may readily be provided for by any engineer or man skilled in the art according to requirements in certain instances.

In Fig. 5, for instance, one form of such a modification is indicated, the ball 17 being retained in its inoperative position by a pawl 20, under the tension of the spring 21, which may readily be made of such tension or strength as to assure a retaining of the ball in its inoperative position, and, on the other hand, assure a discharging of the ball past the pawl 20, to hurl itself against the lever-end 22 with such a force as to lift the opposite lever-end with the catch-pin 16a from engagement, in a similar manner as set forth with reference to catch-pin 16 in Fig. 1, the levers 22 and 16a being of a rigid structure and jointly mounted pivotally at 23.

In order to conform to the requirements of airfoil form in aircraft, the tubular member 18 is connected to the cap by the bottom portion 24 and the top portion 25, extending rearwardly from the cap 9, as illustrated in Figs. 1 and 2.

The ball 17, regardless, could not very well be considered anything but a weight-member, under normal conditions to balance, and under abnormal conditions to overbalance.

Having described a spring-controlled weight-member with reference to the illustration in Fig. 5, the spring merely serving and to be used as a means for maintaining a desired equilibrium, in Fig. 5 the weight-member being, however, not directly connected to or so controlled by the spring, it will, nevertheless, easily be understood, that the spring can just as well be connected directly to a weight-member, and that the weight-member can just as well readily be directly applied to, or be a part of the catch-device, as, for instance, that weight-member 27 and spring 28 could just as well be applied directly to the lever-end 22 as indicated in Fig. 6. The function would clearly be the same, the catch-device to be merely held back under any normal influences, and only to be actuated by any abnormally or undue severe shock, such as an accident, or crash.

From this it should also be understood that it really would be only a matter of proportioning, to make the uppermost end 26 of the catch-device illustrated in Fig. 1 suitably heavy, as indicated at 29 in Fig. 7, to directly form the weight-member, and eventually even attach a spring 30 to this end, to function very much the same as the ball 17, thereby eliminating the ball and the tubular structure 18.

Having thus described my invention, I claim:

1. In a device of the class described, an indicator in form of a balloon containing buoyancy means in sufficient quantities to lift the indicator into the air, a casing of a form to hold the filled indicator in a compressed condition so as to create the tendency that the indicator will expand to such an extent as to discharge from the casing on being freed from the casing, and connecting means whereby the indicator is attached to any structure such as an aircraft.

2. In a device for indicating the location of a grounded aircraft, an indicator in form of a balloon containing buoyancy means in sufficient quantities to lift the indicator into the air independent of the aircraft, a casing of a form to hold the filled indicator in a condition and position so as to create the tendency that the indicator will discharge from the casing on being freed from the casing, means for releasably holding the indicator in the casing, means for automatically freeing the last-named means upon any contacting of the aircraft with any stationary article, such as ground, and connecting means between the indicator and aircraft for retaining the indicator at a suitable distance above grounded aircraft.

3. In a device for indicating the location of a grounded aircraft, an indicator in form of a balloon containing buoyancy-means in sufficient quantities to lift the indicator into the air independent of the aircraft, a casing of a form to hold the filled indicator in a condition and position so as to create the tendency that the indicator will discharge from the casing on being freed from the casing, means releasably engaged with and thereby holding the indicator in the casing, means for automatically disengaging the last-named means from the casing and thereby freeing the indicator upon any contacting of the aircraft with any stationary article, and connecting means between the indicator and the aircraft for retaining the indicator at a suitable distance above the grounded aircraft.

4. In a device for indicating the location of a grounded aircraft, an indicator in form of a balloon containing buoyancy-means in sufficient quantities to lift the indicator into the air independent of the aircraft, a casing of a form to hold the filled indicator in a condition and position so as to create the tendency that the indicator will discharge from the casing on being freed from the casing, means releasably engaged with and thereby holding the indicator in the casing, a locking means on the casing engaging the last-named means with the casing, an actuating means normally in resting position as long as the aircraft is operating normally and otherwise disposed to move against the locking means with sufficient force to cause an unlocking and thereby a disengaging of the first-named means and consequently a freeing of the indicator from the casing upon any contacting of the aircraft with any stationary article of sufficient force to dislodge the actuating means from its resting position, and connecting means between the indicator and the aircraft for retaining the indicator at a suitable distance above the grounded aircraft.

5. In a device for indicating the location of a grounded aircraft, an indicator in form of a balloon inflated with a buoyancy means in sufficient strength to lift itself into the air and to expand to free itself from an inoperative captive compressed position, a holding device comprising a cap and a bowl of a form to hold the filled indicator captive in such compressed condition and ready to expand and rise under such already enclosed buoyancy means when freed, a channel in the holding device, a catch for normally holding the bowl engaged with the cap and having a portion extending into the channel, means normally at rest but free to move in the channel in the direction of said portion to strike the catch for disengaging the bowl from the cap so that the compressed indicator may throw off the bowl to be free to rise into the air, and extensible connecting means of a length to the extent of which the indicator may rise above the aircraft having one end attached to the aircraft and the other end attached to the indicator.

6. In a device for indicating the location of a grounded aircraft, a body having an open chamber, an indicator in the form of a balloon inflated with a buoyancy means in sufficient strength to lift itself into the air from a captive position in the chamber, a retainer movable into and out of an operative position for holding said balloon in said chamber ready to rise under action of the buoyancy means when released, means for releasably securing said retainer in its operative position, a freely movable shock actuated member for striking and moving said securing means to a releasing position normally spaced from the securing means, and a guide for directing said freely movable member into striking engagement with the securing means to move the same to its releasing position when the aircraft is suddenly stopped by striking an obstruction.

7. In a device for indicating the location of a grounded aircraft, a body having an open chamber, an indicator in the form of a balloon inflated with a buoyancy means in sufficient strength to lift itself into the air and to expand the balloon to free itself from a captive position and compressed condition in the chamber, a retainer movable into and out of an operative position for holding said balloon in said chamber in its compressed condition ready to expand and rise under action of the buoyancy means when released, a keeper for releasably securing said retainer in its operative position, a freely movable shock actuated member for striking and moving said keeper to a releasing position normally spaced from the keeper, and a track for guiding said freely movable member into striking engagement with the keeper to move the same to the releasing position when the aircraft is suddenly stopped by striking an obstruction.

8. In a device for indicating the location of a grounded aircraft, an indicator in the form of a balloon inflated with a buoyancy means in sufficient quantities to be ready to rise into the air, a holding device of a form to hold said ready-to-rise indicator captive in a compressed condition, means for removably engaging the holding device to the aircraft, means for automatically disengaging the last named means and releasing the holding device from the aircraft and thereby freeing the indicator for rising upon accidental grounding, and extensible connecting means between the aircraft and the indicator whereby the indicator may rise to the limit of said connecting means.

9. In a device for indicating the location of a grounded aircraft, an indicator in the form of a balloon inflated with a buoyancy means in sufficient quantities to be ready to rise into air, a holding device of a form to hold such ready-to-rise indicator captive in a compressed condition, the holding device comprising interengaged portions and including a pivotally mounted engaging member for holding the portions together with the indicator compressed between the engaged portions, and means for actuating said pivotally mounted member whereby said portions are disengaged and the compressed indicator is enabled to separate the portions sufficiently to rise into air.

10. In a device for indicating the location of a grounded aircraft, an indicator in the form of a balloon inflated with a buoyancy means in sufficient quantities to be ready-to-rise into air, a holding device normally enclosing said ready-to-rise indicator in a compressed condition, the holding device comprising interengaged portions and including a pivotally mounted engaging member for holding the portions together with the indicator compressed between the portions, means cooperating with said pivotally mounted member for automatically disengaging one of said interengaged portions in response to undue shock, whereby the compressed indicator is enabled to separate said portions sufficiently to rise into air, and extensible connecting means between the aircraft and the indicator whereby said indicator may rise to the length of the connecting means above the grounded aircraft.

LAWRENCE R. LUECK.